Patented Oct. 19, 1926.

1,603,709

UNITED STATES PATENT OFFICE.

ALFRED SHELTON OLIVER, JR., AND JAMES MAGNUS JOHNSON, OF MEDICAL LAKE, WASHINGTON.

BREAD.

No Drawing. Application filed March 21, 1925. Serial No. 17,438.

This invention relates to breads of the type employing coarse food stuffs and has for its object the provision of a binder having mucilaginous qualities which when mixed with water will prevent breads containing a high percentage of bran or other coarse ingredients from crumbling after the bread has been baked.

A further object of the invention is the provision of a bread in which an ingredient is employed such as flaxseed meal which will act as a preservative so that the breads may be kept for a longer period of time in an edible condition and thus prevent deterioration of the same.

In the preparation of breads of all types which contain a large percentage of bran, whole or cracked wheat or other coarse food stuff, a great deal of trouble is experienced in maintaining the bread, after it is baked, in the proper form desired due to the fact that the elements of the wheat in the crude state do not supply sufficient binding material for maintaining the particles intact. In such a case it is necessary to employ a mucilaginous material which will bind these particles and prevent crumbling of the bread when baked, yet the difficulty rises from the kind of materials that may be employed in the breads without affecting its flavor, its palatability or its value as a food.

We have found that by the use of a certain percentage of flaxseed meal that not only the particles will hold together and that the palatability of the bread is not affected but that this meal exercises a preservative effect on the bread thus enabling such bread to be kept for a longer period of time in an edible condition without deterioration.

As an example of one form of the invention, to a definite quantity of wheat flour is added 5 to 10 per cent by weight of flaxseed meal which is thoroughly incorporated by mixing into the flour. To this mixture is added and further incorporated therein a quantity of bran from 10 to 15 per cent by weight. This flour is then treated in the usual manner for forming the dough and placed in an oven and baked. The quantity of bran, it will be noted, is of a larger proportion than may be normally incorporated in a loaf of bread and due to the mucilaginous qualities of the flaxseed meal the coarse particles will be held together and the bread will not crumble after the same has been baked into a loaf.

It must be borne in mind that before the flaxseed meal is used the oil in the meal must be expressed in order to remove certain undesirable ingredients which would otherwise affect the flavor of the bread. The oil may be removed by any improved method well known in the art and since the same forms no part of the present invention, no method of removing said oil will be set forth.

What we claim is:

A bread comprising a predetermined quantity of wheat flour, ground flaxseed meal from which the oil has been expressed, and comprising from 5 to 10 per cent by weight of the wheat flour, and bran comprising from 10 to 15 per cent by weight of said wheat flour.

ALFRED S. OLIVER, JR.
JAMES MAGNUS JOHNSON.